United States Patent [19]

Halasa et al.

[11] 3,976,628
[45] Aug. 24, 1976

[54] PROCESS FOR POLYLITHIATING UNSATURATED POLYMERS

[75] Inventors: Adel F. Halasa, Akron; David P. Tate, Northfield, both of Ohio

[73] Assignee: The Firestone Tire & Rubber Company, Akron, Ohio

[22] Filed: Jan. 6, 1970

[21] Appl. No.: 513

Related U.S. Application Data

[63] Continuation of Ser. No. 784,598, Dec. 18, 1968, abandoned, which is a continuation-in-part of Ser. No. 606,011, Dec. 30, 1966, abandoned.

[52] U.S. Cl. ............................... 526/22; 260/880 B; 526/26; 526/49; 526/50; 526/335; 526/340
[51] Int. Cl.² ............................................ C08F 8/32
[58] Field of Search ............... 260/82.1, 85.3, 94.2, 260/879, 880

[56] References Cited
UNITED STATES PATENTS 3,451,988  6/1969  Langer ............................... 260/94.6
3,492,369  1/1970  Naylor ............................... 260/879

*Primary Examiner* — Joseph L. Schofer
*Assistant Examiner* — Richard A. Gaither

[57] ABSTRACT

A polymer is metalated with a lithiating reagent and an tetraalkylethylene, the ratio of active lithium atoms in the lithiating reagent to the molecules of the amine being from 0.01 to 1.5. Such lithiated polymer may then be further reacted to introduce reactive groups of many varieties along the polymer chain. For example, polybutadiene, polyisoprene and other unsaturated polymers may be reacted with butyl lithium and triethylene diamine; and the lithiated polymer may then be reacted with carbon dioxide, and the resulting product may be neutralized to produce a polymer containing carboxyl groups, or the lithiated polymer may be reacted with styrene or a mixture of styrene and butadiene, or styrene and isoprene, etc.

15 Claims, 2 Drawing Figures

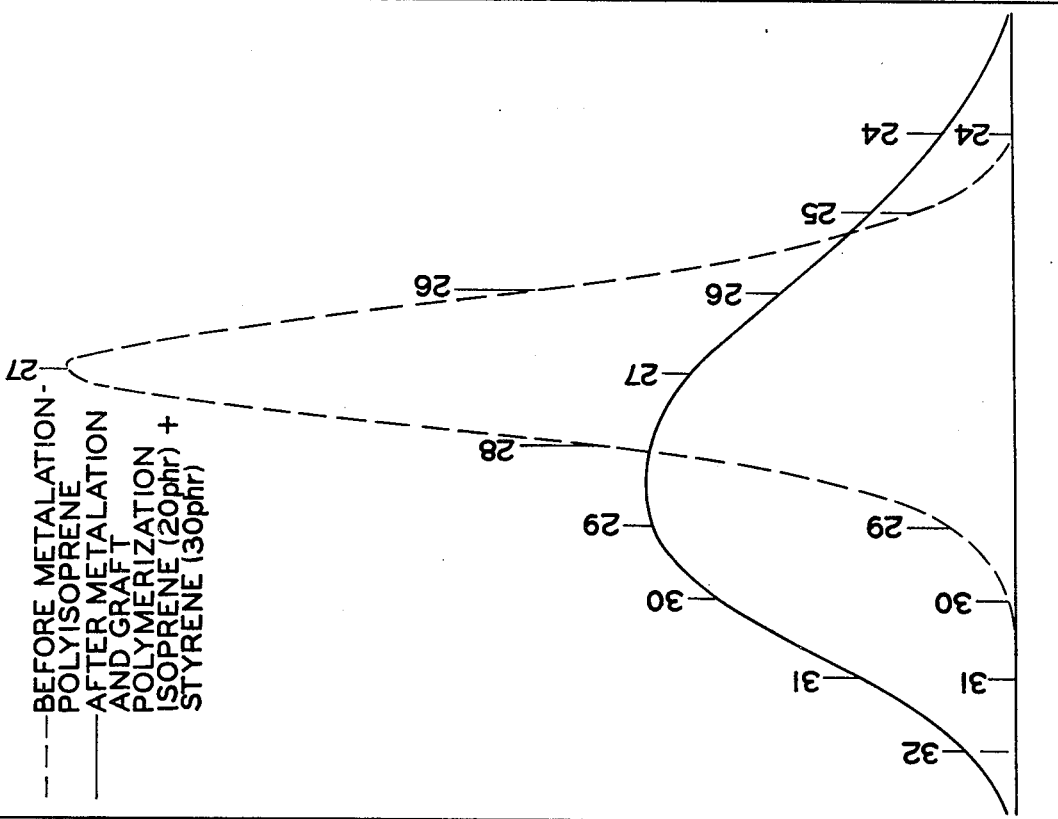
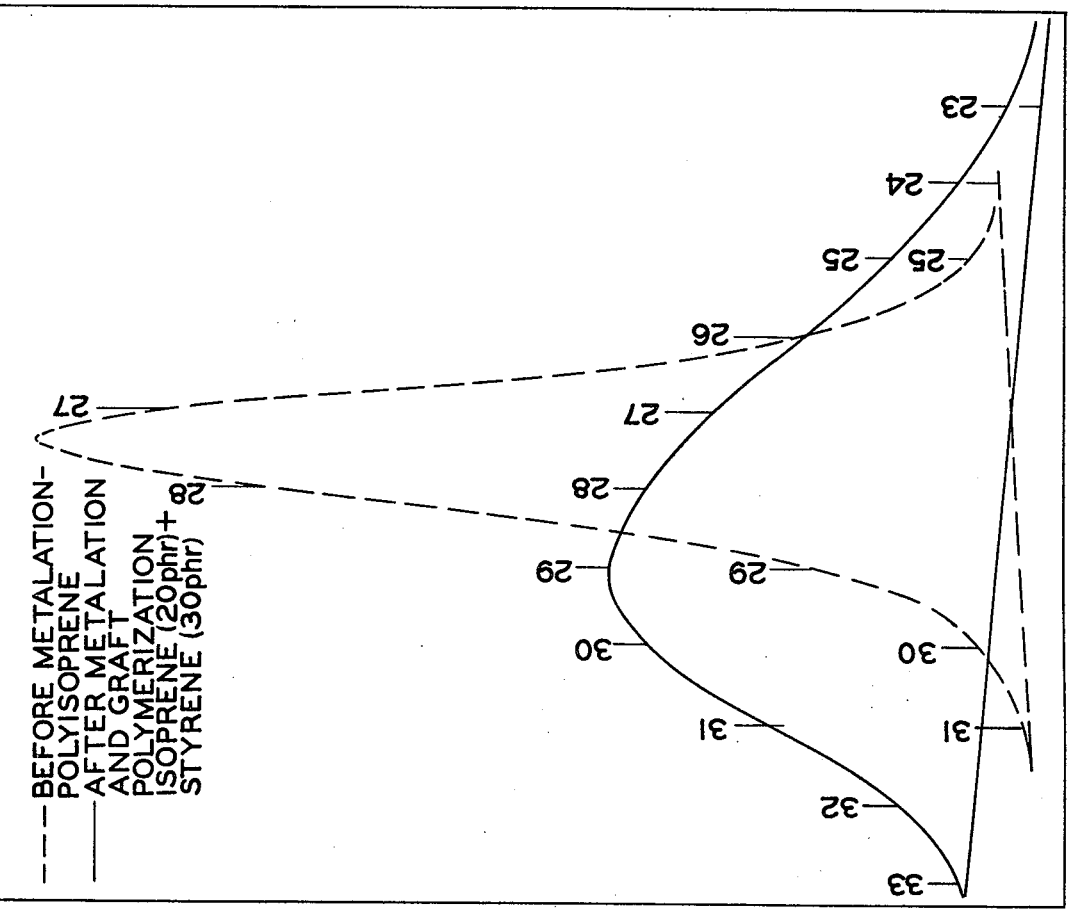

PROCESS FOR POLYLITHIATING UNSATURATED POLYMERS

This application is a continuation of our application Ser. No. 784,598 filed Dec. 18, 1968, now abandoned, which in turn is a continuation-in-part of our application Ser. No. 606,011 filed Dec. 30, 1966 now abandoned.

This invention relates to the lithiation of unsaturated polymers. More particularly it relates to the polylithiation of unsaturated hydrocarbon polymers. (The term "unsaturated " is used herein to include aromatic as well as aliphatic unsaturation between adjacent carbon atoms.) The polymers which are lithiated are usually rubbery and are usually soluble in a non-aromatic hydrocarbon solvent. They are polymers or copolymers which contain a plurality of olefinic groups or copolymers which contain conjugated diene groups of 4 to 6 carbon atoms and aromatic groups. The invention includes the lithiated polymers.

The active lithium in living polymers normally prepared by use of lithium initiators is located only at one or both ends of the polymer chain or branches thereof.

The lithiated products of this invention are not intended primarily for use as polymerization initiators, although they can be so used where graft polymerization is desired. The active lithium atoms in these lithiated products are distributed along the chain in any required amount, depending upon the amount of unsaturation and the amount of lithiation desired.

The lithiated polymers are soluble in non-aromatic hydrocarbon solvents, e.g., hexane, octane, methylcyclohexane and the like. (The term "soluble" herein is used in a general sense to include highly swollen or colloidally dispersed suspensions.)

The polymers which may be lithiated according to the process of this invention include polybutadienes, polyisoprenes, butadiene-styrene copolymers, butadiene-isoprene copolymers, isobutylene-isoprene copolymers (the copolymer commonly called butyl rubber and the like), unsaturated ethylenepropylene terpolymers (the copolymer commonly called EPT or EPDM rubber and the like); homologous polymers derived from homologs of butadiene, etc., such as dimethyl butadiene and the like; and the nitrile derivatives of butadiene, isoprene, etc. These polymers may be dimers, trimers or high polymers, including rubbers more particularly. The molecular distribution may be broad or narrow, the polymers may be linear or branched, and they may be prepared by any of the variety of catalysts known to the art. The invention relates more particularly to the lithiation of the stereo-rubbers often referred to as solution polymers because of the usual preparation of such polymers in an organic solvent giving a product which is free from emulsifiers or other hydrophilic impurities that interfere with the lithiation reaction.

The metalation is carried out by means of a complex formed by the combination of a compound of an alkali metal used for metalation of polymers (referred to herein as $RLi_x$) with a chelating amine. The amine and $RLi_x$ can be added separately or can be pre-mixed or pre-reacted to form an adduct prior to addition to the polymer solution. In the compound $RLi_x$, the R is usually a saturated hydrocarbon radical of any length whatsoever, but ordinarily containing no more than 20 carbon atoms; but it can be an aromatic radical such as phenyl, naphthyl, tolyl, methyl-naphthyl, etc., or it can be a saturated cyclic hydrocarbon radical of, e.g., 5 to 7 carbon atoms, a mono-unsaturated cyclic hydrocarbon radical of, e.g., 5 to 7 carbon atoms, an unconjugated unsaturated aliphatic hydrocarbon radical of 1 to 20 carbon atoms, or it can be an alkyllithium having one or more aromatic groups on the alkyl group, the alkyl group containing 1 to 20 carbon atoms. In the formula, $x = 1$ to 3. Representative compounds of the formula $RLi_x$ include, for example:

methyllithium
i-propyllithium
sec.butyllithium
n-butyllithium
t-butyllithium
n-dodecyllithium
phenyllithium
alpha- and beta-naphthyllithiums
any biphenyllithium
styryllithium
benzyllithium
indanyllithium
1-lithio-3-butene
1-lithio-cyclohexene-3
1-lithio-cyclohexene-2
1,4-dilithiobutane
1,4-dilithiobenzene
1,3,5-trilithiopentane
1,3,5-trilithiobenzene Lithium adducts of polynuclear aromatic hydrocarbons, as described in U.S. Pat. No. 3,170,903, can also be employed, for example, lithium adducts of biphenyl, naphthalene, anthracene or stilbene. Lithium compounds metalate polymers containing aromatic and olefinic functional groups with great difficulty and under high temperatures which degrade the polymer. However, in the presence of tertiary diamines and bridgehead monoamines, metalation proceeds rapidly and smoothly. Generally the lithium metalates the positions allylic to the double bonds in an unsaturated polymer. In the metalation of polymers in which there are both olefinic and aromatic groups, the metalation will occur in the position in which the metalation occurs most readily, as in positions allylic to the double bond or at a carbon to which an aromatic group is attached or in an aromatic group, or in more than one of these positions. Thus the lithium atoms are positioned along the polymer chain, attached to internal carbon atoms away from the polymer terminal carbon atoms (either along the backbone of the polymer or on groups pendant therefrom, or both), in a manner depending upon the distribution of reactive or lithiatable positions. This distinguishes the process and the product from simple terminally reactive polymers which are prepared by using a lithium or polylithium initiator in polymerization. Such prior art polymers have lithium atoms located only at one or both ends of the polymer chain or branches thereof. The extent of the lithiation will depend upon the amount of metalating agent used and/or the groups available for metalation.

The tertiary amines useful in the invention have three saturated aliphatic hydrocarbon groups attached to each nitrogen and include, for example:

A. Chelating tertiary diamines, and preferably those of the formula $R'R''N-C_xH_{2x}-NR'''R''''$ where each R can be a straight- or branched-chain alkyl group of any chain length containing up to 20 carbon atoms or more all of which are included herein, and x can be any whole number from 2 to 10; and particularly the ethylene diamines in which all alkyl substituents are the same. These include, for example
Tetramethylethylenediamine
Tetraethylethylenediamine
Tetradecylethylenediamine
Tetraoctylhexylenediamine
Tetra-(mixed alkyl) ethylene diamines
Cyclic diamines are included such as, for example
The tetralkyl 1,2-diamino cyclohexanes
The tetralkyl 1,4-diamino cyclohexanes
Piperazine
N,N'-dimethylpiperazine
B. The bridgehead diamines which include, for example
Sparteine
Triethylenediamine Tertiary monoamines such as triethylamine are generally not very effective in this reaction. Bridgehead monoamines such as 1-aza(2,2,2) bicyclooctane and its substituted homologs such as the 4-methyl and 4-ethyl substituted derivatives thereof are quite effective.

The lithium compound and the tertiary amine are known to react with each other. Langer, "REACTIONS OF CHELATED ORGANOLITHIUM COMPOUNDS", Transactions of the New York Academy of Sciences, Vol. 27, page 741 (1965). The following structural formulae are illustrative of the reaction products:

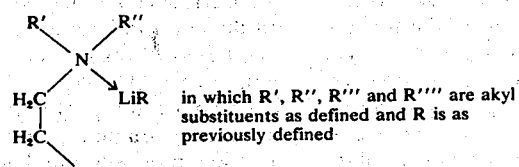
in which R', R'', R''' and R'''' are akyl substituents as defined and R is as previously defined and

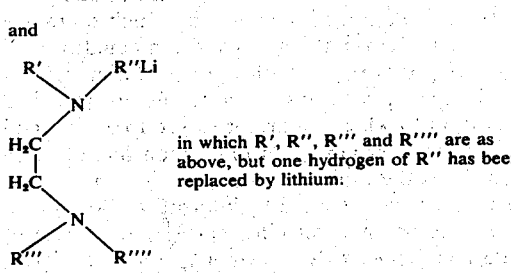
in which R', R'', R''' and R'''' are as above, but one hydrogen of R'' has been replaced by lithium.

By polymer lithiation as disclosed herein, the minimum amount of lithiation which is effective may be as low as one lithium atom per polymer molecule. The maximum will be one lithium for each replaceable hydrogen. This will vary with the polymer involved. Thus butyl rubber which contains a very low amount of unsaturation is capable of adding a lower percentage by weight of lithium than polybutadiene which is an example of a highly unsaturated polymer. For example, in the lithiation of elastomeric polybutadiene one may add only a small number of lithiums for the production of certain end products, but for other end products much more lithium will be desired.

The lithiated polymers are soluble in hydrocarbon solvents. They are desirable intermediates for the production of a wide variety of useful products including rubbers and resins suitable for use in pneumatic tires, adhesives, and in other known rubber articles. Such products are obtained by reaction of the lithiated polymers with carbon dioxide, styrene, methyl methacrylate and other reactive chemicals.

The amount of lithiation depends on the nature of the product desired. Thus the lithium content of the lithiated polymer can range from 0.001 to 1.0 per cent, based on the weight of the unlithiated polymer.

Generally, equimolar amounts of the amine and $RLi_x$ (based on the carbon-bound lithium) will be employed. The ratio of active lithium in the $RLi_x$ to amine can vary from 0.01 to 1.5. There is little advantage however in using a ratio above 1.1.

In general, it is most desirable to carry out the lithiation reaction in an inert solvent such as saturated hydrocarbons. Aromatic solvents such as benzene are lithiated and may interfere with the lithiation of the unsaturated polymer. Unsaturated polymers that are easily lithiated, however, can be successfully lithiated in benzene, since the lithiated aromatic compound that may be initially formed will itself lithiate the unsaturated polymer. Solvents, such as chlorinated hydrocarbons, ketones and alcohols, should generally not be used, because they destroy the lithiating compound.

The process of this invention can be carried out at temperatures ranging from −70° C. to +150° C., but preferably in the range of 0° to 100° C., the upper temperature being limited by the thermal stability of the lithium compounds. The lower temperature is limited by considerations of production rate, the rate of reaction becoming unreasonably slow at low temperatures.

The length of time necessary to complete the lithiation and subsequent reactions is largely dependent upon the temperature.

It is well known that organolithium compounds react with a wide variety of reactive chemicals to produce new chemicals of laboratory interest. We have found that the lithiated polymers produced by the process of this invention react with the same types of reactive chemicals to produce products of commercial importance. For instance:

1. The lithiated polymers can be reacted with carbon dioxide and the reaction product neutralized with mineral acid to produce a carboxylated polymer, wherein the degree of carboxylation is dependent upon the amount of lithiation.
2. Polymeric glycols and polyols can be prepared by reaction of the lithiated polymers with ethylene oxide. Similarly, amines can be prepared by reaction with nitriles.
3. Since the lithiated polymer is itself a lithium compound capable of initiating the polymerization of dienes and certain vinylic compounds, graft copolymers or homopolymers can be prepared by adding styrene or other lithium-polymerizable monomer to the lithiated polymer.
4. Block copolymers which cannot be produced by other known means can be prepared conveniently by reaction of a segment of a polymer which may be the same as the lithiated polymer or different therefrom, having a reactive halogen group with the lithiated polymer; that is, a halogen group which is alpha to an activating group.
5. The lithiated polymers show many of the reactions characteristic of organolithium compounds such as reactions with ketones, aldehydes, esters, nitriles, silicon halides, isocyanates, carboxylic acids and salts, $SO_2$, acid chlorides, etc., and reaction products can be made therewith.

In the production of metal salts of the carboxylated polymers, if the polymer is produced by polymerization of a monomer in an organic solvent using a lithium-based catalyst, a solution of a live polymer is obtained. This can readily be metalated as, for example, with lithium and the lithiated polymer may then be carboxylated. Vulcanizable rubbery compositions containing the carboxylated polymers have high green strength. The lithium in the carboxylate can then be replaced by another metal if desired. If, on the other hand, the product is made from dry rubber, it is necessary to first dissolve the polymer to make a cement and then metalate, followed by carboxylation and then, if desired, conversion of the resulting salt to a salt of a different metal. Such processes are illustrated in the following examples.

The following examples are illustrative. Unless otherwise specified, all amounts are by weight. In the examples, TMEDA is used to stand for tetramethylethylenediamine.

EXAMPLE 1

PURIFICATION OF EPT RUBBER

EPT rubber (ethylene-propylene-1,4-hexadiene), produced by E. I. duPont deNemours & Co. and known as Nordel 1040 rubber, was dissolved in hexane to form a cement containing 14 per cent by weight of polymer. Of this stock of cement, 725 g. (containing about 100 g. polymer) was added slowly to 2000 cc of acetone with continuous, vigorous agitation to precipitate the elastomer as white crumbs. The crumbs were separated from the liquid phase and dried in a vacuum oven at 70° C. over night. The polymer was then subjected to high vacuum pumping (fractional mm) for 7 hours. The polymer thus purified was used for metalation runs. Some runs were also made using polymer which had not been purified, as recorded in the tabulation.

METALATION

Into a 28-ounce container of the type commonly used in polymerization research was placed 29 g. of EPT, purified as above. A lamp-grade nitrogen atmosphere was established and hexane was added to make a cement containing 10.8 per cent polymer. In order to effect metalation of the EPT at alphamethylene groups, the following ingredients, constituting the metalating agent, were added:

|  | mMphp* | ADDED AS |
|---|---|---|
| n-Butyllithium | 217 | 39.6 cc of 1.59 molar hexane solution |
| TMEDA | 272 | 12.1 cc neat |

*Millimoles per 100 parts of polymer.

The bottle containing the reaction mixture was rotated in a 50° C. water bath for 16 hours, to bring about metalation of the polymer, after which the bottle was removed from the water bath and brought to room temperature.

Proof of metalation of the polymer was made by carbonation with pure carbon dioxide whereupon prompt reaction occurred to produce a derivative polymer which could be isolated and titrated as a carboxylic acid. Also, the metalated polymer could be reacted with trimethylsilyl chloride and bound silicon determined by ignition to ash.

The above metalation run and variations thereof are tabulated as follows:

METALATION RUNS OF EPT

| RUN NO. | EPT POLYMER* | UNSATUR-ATION** | BuLi | TMEDA | TEMP. °C. | TIME HRS. | REACTION CONDUCTED WITH METALATED POLYMER |
|---|---|---|---|---|---|---|---|
| A | Nordel 1040 purified | 28 | 5.6 | 2.4 | 50 | 40 | silylation |
| B | Nordel 1040 not purified | 28 | 108 | 136 | 30 | 4 | '' |
| C | Nordel 1040 purified | 28 | 217 | 271 | 50 | 16 | carbonation |
| D | Nordel 1040 not purified | 28 | 108 | 136 | 30 | 16 | '' |
| E | Nordel 1070 purified | 54 | 5.6 | 2.4 | 50 | 40 | '' |
| F | Nordel 1070 purified | 54 | 1.9 | 2.4 | 30 | 48 |  |
| G | Nordel 1070 purified | 54 | 3.8 | 4.7 | 30 | 72 |  |

*Nordel 1040 has viscosity of 40 $ML_4/212°F$.; Nordel 1070 has viscosity of 70. Both are ethylene-propylene-1,4-hexadiene terpolymers.
**Unsaturation values are in millimoles per 100 grams of polymer.

The polymers in the above table identified as produced by Runs No. C through G, have good green strength and because of this are valuable for compounding with other rubbers to be used in tire stocks as, for example, in sidewall stocks, body stocks and tread stocks, and in other products such as in belts, etc. The lithium may be replaced by other metals to obtain polymers of high green strength which have other valuable properties as, for example, the zinc carboxylate which has added value in vulcanization. Other salts can be produced which may not impart added value as such as, for example, the salts of other metals of Groups I and II and, in fact, any other metal. However, if the polymer is produced with a lithium catalyst, the conversion to another metal salt may be unprofitable.

These carboxylated products are valuable for use as rug backing compounds because in addition to providing a non-slip surface, they resist discoloration and embrittlement on aging, which is an objectionable feature of the unsaturated carboxylated materials now commercially used. The degree of adhesion can be varied by variation of the carboxyl content. Also they are curable rubbers and set on curing with sulfur, etc. in the usual EPT formulae.

EXAMPLE 2

METALATION OF POLYBUTADIENE AND ADDITION OF STYRENE TO FORM A BLOCK COPOLYMER

A 20-percent by weight solution of pure butadiene was prepared in hexane which had been distilled over sodium. This solution was passed slowly through a 2×24 inch column of alumina into baked, nitrogen-flushed 28-ounce bottles. Four hundred ml. of the solution were placed in each bottle. Each bottle was heated to drive off about 3 g. of butadiene. The bottles were capped and catalyzed with a solution of n-butyllithium in hexane, 0.7 millimoles per 100 parts butadiene. After 17 hours at 50°C. in a rotating polymerizer the bottles contained a light yellow viscous cement. To each bottle there was added six millimoles of n-butyllithium per 100 grams of butadiene and 6 millimoles of N,N'-tetramethylethylenediamine per 100 grams of butadiene, and heating was continued as before at 50°C. for two hours. The polymer cements at this time were dark reddish-brown in color and were somewhat more fluid than before the butyllithium TMEDA treatment. To three similar reaction mixtures was added sufficient pure dry styrene to give styrene concentrations of 15, 25 and 35 per cent. (Runs No. A, B and C of the following table.) After thorough mixing, the bottles were allowed to stand at room temperature overnight. Antioxidant was added (dibutyl-p-cresol + Tenamene 31, a dioctyl derivative of para-phenylenediamine), and the polymers were coagulated in methanol and dried to constant weight in a vacuum oven at 50°C.

A 4 × 4 × 0.04 slab and a 1 × 3 × ¼ bar were pressed at about 160°–180°C. from each of the three samples and physical properties were determined as follows:

The styrenated products produced according to the above procedure are both thermoplastic and rubbery in that after molding they can be remolded at elevated temperatures with no change in properties. The results given for Runs No. A, B and C, show that when a small amount of catalyst is used, resulting in a relatively high molecular weight polymer, the polymers have high elongation. They also have good tensile strength. Tensile strength and elongation are varied by varying the amount of styrene reacted with the metalated product. Thus, by using different amounts of catalyst, as in Runs No. D, E and F, to produce higher or lower molecular weight polymers and then reacting these with the same amount of styrene, higher and lower tensile strengths, elongations and other physical properties are obtained. The use of different amounts of styrene yield products having different properties. Products of much higher tensile strength or greater elongation can be obtained.

The recorded results are indicative of the fact that the products can be tailored to produce rather widely varied desired properties.

Block copolymers prepared in this manner when cured in tire formulations give improved wet traction but retain the low temperature properties of the polybutadiene. The improved wet traction is indicated by the Stanley-London wet friction rating as described in the Preprints of the 1964 Detroit meeting of the Rubber Division of the American Chemical Society. Below are certain physical properties of several butadiene-styrene block copolymers (Runs No. 1, 2 and 4) and a block copolymer prepared by metalation of a butadiene-isoprene copolymer, (Run No. 3) followed by styrenation of this metalated polymer each compounded according to the following formula:

| Polymer | 100 | parts by weight |
|---|---|---|
| HAF black | 50 | " |
| Stearic acid | 2 | " |
| Zinc oxide | 3 | " |
| Processing oil | 5 | " |
| Sulfur | 1.7 | " |
| Accelerator | 0.7 | " |

The modulus, tensile strength and elongation reported in the following table were determined on stocks cured at 293°F. for 25, 50 and 100 minutes, as indicated. The Shore "A" hardness and steel ball rebound were determined at the temperatures indicated, on stocks cured 50 minutes at 293°F. The Stanley-London friction rating was determined on wet frosted glass at 20°C. with stock cured 50 minutes at 293°F. The control was polybutadiene obtained by polymerization with lithium-based catalyst.

METALATION OF POLYBUTADIENE

| RUN NO. | A | B | C | D | E | F |
|---|---|---|---|---|---|---|
| Polymerization: | | | | | | |
| BuLi, mmoles/100 g. Monomer | 0.7 | 0.7 | 0.7 | 1.0 | 2.0 | 3.0 |
| Metalation: | | | | | | |
| BuLi, mmoles/100 g. polymer | 6.0 | 6.0 | 6.0 | 6.0 | 6.0 | 6.0 |
| TMEDA, mmoles/100 g. polymer | 6.0 | 6.0 | 6.0 | 12.0 | 12.0 | 12.0 |
| Product Properties: | | | | | | |
| % Styrene (infrared) analysis) | 21.3 | 30.2 | 40.2 | 35.0 | 35.0 | 35.0 |
| Tensile strength at Break | 425 | 825 | 1100 | 850 | 300 | 75 |
| Modulus at 300% | 175 | 475 | 550 | | | |
| % Elongation at break | 940 | 620 | 500 | 600 | 300 | 40 |
| Young's Modulus, psi at 70°C. | 1290 | 1855 | 7355 | | | |
| Shore A Hardness at 73°F. | 48 | 62 | 79 | 66 | 57 | 51 |

PROPERTIES

| RUN NO. | CONTROL | 1 | 2 | 3 | 4 |
|---|---|---|---|---|---|
| Analysis, %: | | | | | |
| Styrene | 0 | 6.7 | 10.7 | 25 | 32.6 |
| Butadiene | 100 | Balance | Balance | 59.5 | Balance |
| Isoprene | 0 | 0 | | 15.2 | 0 |
| 300% Modulus, psi: | | | | | |
| 25' | 625 | 675 | 850 | 1300 | 2075 |
| 50' | 925 | 850 | 1150 | 1750 | 2475 |
| 100' | 900 | 825 | 1150 | 1800 | — |
| Tensile strength, psi: | | | | | |
| 25' | 1475 | 1925 | 2550 | 2450 | 2375 |
| 50' | 1975 | 2275 | 2850 | 2550 | 2700 |
| 100' | 1900 | 2050 | 2725 | 2500 | 2500 |
| Elongation, %: | | | | | |
| 25' | 520 | 630 | 700 | 610 | 350 |

PROPERTIES-continued

| RUN NO. | CONTROL | 1 | 2 | 3 | 4 |
| --- | --- | --- | --- | --- | --- |
| 50' | 480 | 600 | 590 | 430 | 310 |
| 100' | 470 | 560 | 570 | 380 | 300 |
| Shore "A" Hardness: | | | | | |
| 73° F. | 59 | 60 | 65 | 71 | 81 |
| 212° F. | 60 | 56 | 59 | 64 | 75 |
| % Steel Ball Rebound: | | | | | |
| 73° F. | 64 | 62 | 62 | 55 | 49 |
| 212° F. | 63 | 61 | 59 | 47 | 48 |
| Stanley-London Friction Rating: | 39.0 | 41.0 | 40.0 | 47.5 | 44.0 |

EXAMPLE 3

METALATION OF POLYBUTADIENE AND ADDITION OF ETHYLENE OXIDE TO INTRODUCE HYDROXYETHYL GROUPS

Two sameple of low molecular weight polybutadiene were prepared by polymerization in hexane, catalyzing with 40 millimoles of n-butyllithium per 100 grams of monomer. These two solutions of live polybutadiene polymer were then metalated as described below, cooled in frozen carbon dioxide, and then reacted at room temperature with a quantity of liquid ethylene oxide in excess over that required to act with both the terminal lithium on the live polymer chain and the lithium introduced by metalation.

TABLE

| Polymerization: | 1 | 2 |
| --- | --- | --- |
| n-Butyllithium, mmoles/100 g. monomer | 40 | 40 |
| Hours at 50° C. | 17.3 | 17.3 |
| Metalation: | | |
| n-Butyllithium, mmoles/100 g. polymer | 40 | 80 |
| TMEDA, mmoles/100 g. | 80 | 80 |
| Hours at 50° C. | 2 | 2 |
| Hydroxyethylation: | | |
| Ethylene oxide, mmoles/100 g. polymer | 864 | 920 |
| Product Properties: | | |
| Hydroxyl number | 32.6 | 38.7 |
| Inherent viscosity | 0.11 | 0.10 |
| Molecular weight, found* | 2038 | 2215 |
| Molecular weight, calculated** | 2500 | 2500 |
| Molecular weight, calculated from OH number: | | |
| (a) 1 OH/mole | 1720 | 1448 |
| (b) 2 OH/mole | 3440 | 2896 |
| Ratio molecular weight found/molecular weight (a, above) | 1.2 | 1.5 |

*By vapor-phase Osmometer.
**Calculated from catalyst concentration.

From the foregoing, and particularly from the molecular weight ratios given in the last line of the foregoing table, it is evident that hydroxylation occurred along the chain of the polymer as well as at the terminal lithium. Polyurethanes prepared from the polyhydroxylated fraction when reacted with toluene diisocyanate or other diisocyanate or a prepolymer are useful where polyurethane fibers or other rubbers have been used. By introducing two or more hydroxyls along the chain, unusual polyurethane products are obtainable.

EXAMPLE 4

METALATION OF POLYBUTADIENE AND ADDITION OF METHYL METHACRYLATE

A 10-percent by weight solution of butadiene in hexane was polymerized with n-butyllithium. The polymer cement thus obtained was metalated with additional n-butyllithium and TMEDA. Pure dry methyl methacrylate was added to the metalated polymer after it had been cooled in frozen carbon dioxide. The treated polymers were allowed to remain in the carbon dioxide until it evaporated and then were allowed to stand at room temperature for five days before the polymers were isolated by coagulation in methanol in the presence of antioxidant. The dried treated polymers were non-flowing in contrast with the polymer which before treatment with methyl methacrylate flowed when allowed to stand at room temperature. The treated polymers also had considerable elasticity and green strength. Details of the preparation and certain properties of the final products are given in the following table.

| RUNS NO. | A | B |
| --- | --- | --- |
| Catalyst, BuLi, mmoles/100 grams of monomer | 1.0 | 1.0 |
| Methyl methacrylate, Wt.% | 5.0 | 13.6 |
| Metalation catalyst,* mmoles/100 grams of polymer | 6.0 | 6.0 |
| Inherent viscosity | 2.32 | 4.11 |
| % Gel | 55.0 | 17.5 |

*Equal amounts of n-butyllithium and tetramethylenediamine.

Before metalation and reaction with methyl methacrylate, the polymer had an inherent viscosity of 1.5 and contained no detected gel.

The styrenated products according to the above procedure are both thermoplastic and rubbery because after molding they can be remolded at elevated temperatures with no change in properties. These styrenated copolymers can be cured with sulfur using formulae employed in the curing of polybutadiene. It is not necessary to vulcanize the styrenated copolymers so films can be obtained directly by casting.

EXAMPLE 5

METALATION OF POLYBUTADIENE AND ADDITION OF BUTADIENE TO FORM A BLOCK POLYMER

Butadiene (49.3 gms.) was polymerized as a 20% solution in hexane with 0.9 millimoles of n-butyllithium per 100 grams of butadiene. The resulting polymer cement was heated 3 hours at 50°C. in the presence of six millimoles of butyllithium and six millimoles of TMEDA per 100 grams of butadiene, as metalating agent. The metalated polymer solution was cooled in dry ice and 21.5 g. of purified butadiene was distilled into it. After standing over night at room temperature, the solution was heated one hour at 50°C., treated with antioxidant and coagulated in methanol. The polymer weighed 64 grams. The weight percent yield was 90 percent based on total butadiene monomer introduced. This indicated that 68.5 percent of the second butadiene increment had added to the initially prepared polymer.

The butadiene addes to the metalated polymer to produce polybutadiene segments having high 1,2-microstructure. The final product has this microstructure:

| | |
|---|---|
| cis-1,4 | 22.3% |
| trans-1,4 | 45.4% |
| 1,2 | 32.3% |
| Total | 100.0% |

It was compounded in the following formula:

| | | |
|---|---|---|
| Polymer | 100 | parts by weight |
| HAF black | 50 | " |
| Stearic acid | 2 | " |
| Zinc oxide | 3 | " |
| Processing oil | 5 | " |
| Sulfur | 1.7 | " |
| Accelerator | 0.7 | " |

The stock was cured for different lengths of time, as indicated in the following table.

| CURE AT 293° F. | 25 min. | 50 min. | 100 min. |
|---|---|---|---|
| Tensile strength, p.s.i | 1575 | 2000 | 1700 |
| 300% Modulus, p.s.i. | 1100 | 1500 | 1600 |
| % Elongation | 380 | 370 | 320 |

The product obtained on the 50-minute cure had the following additional properties:

| | |
|---|---|
| Shore "A" Hardness at 73° F. | 64 |
| Dynamic Modulus* | 273 p.s.i. |
| Static Modulus* | 145 p.s.i. |
| Internal Friction* | 7.6 k.p.s. |
| Young's Modulus at −60° C.* | 8180 p.s.i. |

*Determined according to method described by Dillon, Prettyman and Hall in JOURNAL OF APPLIED PHYSICS 309 (1944).

It is noted that the internal friction is relatively low for a rubber having a 1,2-addition product content of over 30 percent.

The vulcanizate has better wet traction than linear polybutadiene vulcanizates and therefore is valuable for use in tire treads.

EXAMPLE 6

METALATION OF POLYBUTADIENE AND REACTION WITH CARBON DIOXIDE

A 10-percent solution by weight of butadiene in heptane was polymerized at 50°C. with 0.8 millimoles of n-butyllithium per 100 grams of monomer. The resulting polymer was metalated for 4 hours at 50°C. with 20 millimoles of n-butyllithium per 100 grams of polymer and 22 millimoles of TMEDA per 100 grams of polymer. The resulting polymer had an inherent viscosity of 2.03 prior to metalation, and after metalation the polymer had an inherent viscosity of 1.03. This solution of polymer was carboxylated with carbon dioxide gas by turbulent mixing in a tube. On diluting with toluene, acidifying with hydrochloric acid, and then coagulating in methanol, the carboxylated product was recovered. It had an inherent viscosity of 1.22. On analysis it contained 0.142 milli-equivalents of carboxyl per gram. This shows 71 percent utilization of the lithium used in the metalation reaction.

A carboxylated polymer similarly prepared and containing 0.135 milli-equivalents of carboxyl per gram was compounded in the following formula:

| | | |
|---|---|---|
| Polymer | 100 | parts by weight |
| HAF black | 50 | " |
| Zinc oxide | 3 | " |
| Stearic acid | 2 | " |
| Processing oil | 5 | " |
| Sulfur | 1.7 | " |
| Accelerator | 0.7 | " |

The product cured rapidly and had the following properties when cured at 293° F. for 25 minutes.

| Tensile strength, p.s.i. | 1725 |
|---|---|
| % Elongation | 260 |

The properties may be varied to obtain a product of higher or lower carboxyl content by controlling the extent of carboxylation, and by using different compounding recipes, vulcanizates having a wide variety of physical properties are obtainable.

Polyesters derived by reaction of the carboxylated products with glycols are useful as resins where polyesters have been used. On reaction with diisocyanates, these polyesters form polyurethanes having varied and useful properties depending upon their carboxylate content and other variations.

These carboxylated products are curable rubbers, and can be cross-linked by reaction with metal oxides, metal hydroxides, amines and similar basic reagents, as is known in the art. The unsaturated products are also curable by sulfur, as disclosed in U.S. Pat. No. 2,849,426.

METALATION OF POLYISOPRENE AND GRAFT COPOLYMERS OF POLYISOPRENE

Tacky graft copolymers are obtained by lithiating polyisoprene and then replacing the lithium with styrene or alphamethyl or other alkyl chain- or ring-substituted styrene in which the alkyl group contains up to 6 carbon atoms, and other polymerizable diene monomer may be added.

In producing the tacky graft copolymer, the amount of monomer or mixture of monomers added may be varied. If the polyisoprene is lithiated to a lesser degree, a minimum amount of grafting produces a less tacky but stronger graft copolymer, and a greater amount of lithiation increases tack but decreases strength. Some butadiene or isoprene may be added with the styrene. Thus, one may use 10 to 100 parts of copolymerizable monomer per 100 parts of polyisoprene, and this monomer may be 0 to 100 parts of styrene or polymerizable styrene derivative or a mixture thereof, or up to 100 parts of said styrene or derivative thereof may be replaced by a conjugated diene or mixture thereof, preferably butadiene, isoprene or piperylene. The polyisoprene has a molecular weight of 200,000 to 2,000,000 and preferably about 300,000 to 1,000,000. It may be a live polymer cement or it can be made into a cement by starting with a dry polyisoprene which may be natural rubber or a synthetic produced by any usual method of polymerization, and preferably a stereopolymer. One may use from about 2 to 100 moles, and preferably 6 to 30 mmoles of lithium per 100 grams of polyisoprene.

The tacky polymers may be used in a variety of ways, as (1) in the production of cements for building tack by application between fabric plies in the manufacture of tires, belts, etc., (2) in adhesive recipes which include rubbery materials, lending tack thereto, and (3) as a general purpose rubber for use in body stocks and tread stocks for tires, etc.

The following examples are illustrative.

EXAMPLE 7

METALATION OF POLYISOPRENE AND REACTION WITH ISOPRENE AND STYRENE

Isoprene was polymerized in a 28-oz. bottle using the following recipe and conditions:

| | |
|---|---|
| Isoprene, g. | 100 |
| Heptane, ml. | 670 |
| n-Butyllithium, mm | 0.324 |
| Polymerization temperature | 122° F. |
| Time, hours | 21.5 |

The polymer cement was cooled to room temperature and then lithiated using the following reagents and conditions:

| | |
|---|---|
| TMEDA*, mM/100 g. Polymer | 20.0 |
| n-Butyllithium, mM/100 g. Polymer | 16.0 |
| Metalation temperature | 122° F. |
| Metalation time, hours | 4.0 |

*TMEDA stands for tetramethylethylenediamine.

The lithiated polyisoprene cement was cooled to room temperature. To the lithiated polymer cement, a mixture of 15 g. of isoprene was added as a 15% solution in heptane, and 20 g. of styrene was added. The content of the bottle was extensively mixed by shaking by hand. The resulting cement was then reacted at 122°F. for 2 hours, in order to polymerize the added monomers. The bottle was removed and the polymer terminated by addition of 1 ml. of methanol. The polymer cement was coagulated in methanol, stabilized with antioxidant and dried to a constant weight, in a vacuum oven at 140°F. The following physical properties were obtained on the raw polymer:

| | |
|---|---|
| Dilute Solution Viscosity, dl./g. | 2.17 |
| % Gel | 7.0 |
| % Block Styrene | 0 |

| MICROSTRUCTURE | ISOPRENE PORTION | COPOLYMER |
|---|---|---|
| % Cis-1,4 | 68.1 | 50.1 |
| % Trans-1,4 | 10.7 | 7.9 |
| % 1,2 | 1.4 | 1.1 |
| % 3,4 | 19.8 | 14.5 |
| % Styrene | — | 26.5 |
| Total Found, % | 100 | 89.0 |

The resulting polymer was compounded in the recipe shown below and the compounded properties, including green strength and windup tack, were observed and compared to a commercial synthetic polyisoprene with excellent tack and green strength.

| | CONTROL | TEST |
|---|---|---|
| Control Polymer | 100 | |
| Test Polymer | | 100 |
| Black | 50 | 50 |
| Zinc Oxide | 3.0 | 3.0 |
| Stearic acid | 2.6 | 2.6 |
| Oil | 3.0 | 3.0 |
| Antioxidant | 2.6 | 2.6 |
| Retarder | 0.5 | 0.5 |
| Sulfur | 2.6 | 2.6 |
| Accelerator | 0.35 | 0.35 |
| Total | 164.65 | 164.65 |
| Instron Wind-up Tack | | |
| Average (lbs./in.) | 25.5 | 6.30 |
| Green Stress-Strain Properties: | | |
| Initial (lbs.) | 2.375 | 3.75 |
| Peak (lbs.) | 5.35 | 8.475 |
| Break (lbs.) | 5.35 | N.B.* |
| Lbs. at Full Clamp Separation | 5.35 | 8.2 |
| % Elongation | 1275 | 1800 |
| Normal Stress-Strain Properties; 45' Cure at 280° F.: | | |
| 300% (lbs.) | 1850 | 1225 |
| Tensile (lbs.) | 3775 | 2500 |
| % Elongation | 496 | 580 |

*N.B. indicates "No Break".

The polymer tested showed excellent physical properties as compared to the control. The green strength test showed that the test sample has better peak, break and elongation values superior to that of the control.

EXAMPLE 8

METALATION OF POLYISOPRENE

Six 28-oz. bottles of polyisoprene were prepared using the following recipe and conditions:

| | |
|---|---|
| Isoprene, g. | 100 |
| Heptane, ml. | 735 |
| n-Butyllithium, mM | 1.39 |
| Polymerization Temperature, | 122° F. |
| Time, hours | 3.0 |

The polymer cement was cooled to room temperature and then lithiated using the following reagents and conditions:

| | |
|---|---|
| TMEDA*, mM/100 g. Polymer | 14.3 |
| n-BuLi, mM/100 g. Polymer | 11.4 |
| Metalation Temperature, °F. | 122 |
| Metalation time, hours | 4.0 |

*TMEDA stands for tetramethylenediamine.

The lithiated polyisoprene cement also was cooled to room temperature. To the lithiated polymer cement, a mixture of 15 g. of isoprene, added as a 15% solution in heptane, and 23.5 g. of styrene was added. The content of the bottle was extensively mixed by shaking by hand. The resulting cement was then reacted at 122°F. for 2 hours, in order to polymerize the added monomers. The bottle was removed and the polymerization terminated by addition of 1 ml. of methanol. The polymer cement was coagulated in methanol, stabilized with antioxidant and dried to a constant weight in a vacuum oven at 140°F. The following physical properties were obtained on the raw polymer:

| | | |
|---|---|---|
| Dilute Solution Viscosity, dl./g | 1.93 | |
| % Gel | 0 | |
| % Block styrene | Trace | |
| Microstructure: | Isoprene Portion | Copolymer |
| % cis-1,4 | 74.9 | 54.1 |
| % trans-1,4 | 8.1 | 5.8 |
| % 1,2 | 0.8 | 0.6 |
| % 3,4 | 16.2 | 11.7 |
| % styrene | — | 27.8 |
| Total found, % | 100.0 | 92.0 |

The resulting polymer was compounded in the recipe shown below and the compounded properties including green strength and wind-up tack were observed and compared to a natural rubber stock which has excellent tack and green strength.

|  | CONTROL | TEST |
|---|---|---|
| Natural rubber | 100 |  |
| Copolymer |  | 100 |
| Black | 46.4 | 50 |
| Zinc oxide | 3.36 | 2.6 |
| Stearic acid | 3.02 | 3.0 |
| Oil | 2.0 | 3.0 |
| Antioxidant | 2.5 | 2.6 |
| Retarder | 3.64 | 0.5 |
| Sulfur |  | 2.6 |
| Accelerator | 0.51 | 0.35 |
| Total | 161.43 | 164.65 |
| Instron Wind-up Tack |  |  |
| Average (lbs./in.) | 31.0 | 8.0 |
| Green Stress-Strain Properties: |  |  |
| Initial (lbs.) | 2.15 | 2.95 |
| Peak (lbs.) | 7.60 | 3.90 |
| Break (lbs.) | 7.60 | N.B.* |
| Lbs. at Full Clamp. Sep. | — | 3.55 |
| % Elongation | 988 | 1700 |
| Normal Stress-Strain Properties, 45' cure at 280°F.: |  |  |
| 300% Modulus | 1225 | 1075 |
| Tensile | 3600 | 2175 |
| % Elongation | 550 | 560 |

*N.B. indicates "No Break".

EXAMPLE 9

METALATION OF POLYISOPRENE

Isoprene was polymerized in a 28-oz. bottle using the following recipe and conditions:

| Isoprene, g. | 100 |
| Heptane, ml. | 745 |
| n-Butyllithium, mM | 0.093 |
| Polymerization temperature, | 122° F. |
| Time, hours | 3.0 |

The polymer cement was cooled to room temperature and then lithiated using the following reagents and conditions:

| TMEDA, mM/100 g. Polymer | 21.75 |
| n-BuLi, mM/100 g. Polymer | 17.4 |
| Metalation Temperaure, | 194° F. |
| Metalation Time, hours | 2.0 |

The lithiated polyisoprene cement also was cooled to room temperature. To the lithiated polymer cement, a mixture of 42 g. of isoprene, added as a 20-per cent solution in heptane, and 30 g. of styrene was added. The content of the bottle was extensively mixed by shaking by hand. The resulting cement was then reacted at 122°F. for 15.5 hours. The bottle was removed and the polymer terminated by addition of 1 ml. of methanol. The polymer cement was coagulated in methanol, stabilized with antioxidant and dried to a constant weight in a vacuum oven at 140°F. The following physical properties were obtained on the raw polymer:

| Dilute Solution Viscosity, dl./g. | 1.09 |
| % Gel | 0 |
| % Block styrene | 0 |

| Microstructure: | Isoprene Portion | Copolymer |
|---|---|---|
| % cis-1,4 | 54.9 | 38.7 |
| % trans-1,4 | 15.3 | 10.8 |
| % 1,2 | 2.7 | 1.9 |
| % 3,4 | 27.2 | 19.1 |
| % styrene | — | 29.5 |
| Total Found, % | 100.0 | 100.0 |

EXAMPLE 10

A 28.5/71.5 (wt. ratio) blend of isoprene and n-heptane was prepared. One hundred and forty pounds of the blend were transferred to the polymerization vessel (a fifty-gallon, anchor agitated, nickel clad reactor). The blend was initiated with 15-per cent n-butyllithium solution as indicated in Table 10-1. The reaction was followed to total conversion. The batch was lithiated at 125°F. with 30 phr N,N,N',N'-tetramethylethylene-diamine and 24 phr n-butyllithium. The lithiation reaction was allowed to continue for 20-24 hours.

Following the lithiation reaction, the graft polymerization was performed. In the first run (Sample 10-A) 30 phr styrene as a 30-per cent solution in n-heptane were added to the batch. In the last two polymerizations (Samples 10-B and 10-C) 30 phr styrene plus 20 phr isoprene as a 30-per cent monomer solution in heptane were added to the batch. The graft polymerizations were run to total conversion (125°-144°F. max.) in about two hours. The batches were terminated in the reactor by the addition of methanol equivalent to the butyllithium added for metalation (24 phm).

After termination, the batches were dropped beneath hexane and stabilized with 0.2 phr di-butyl-para-cresol. The batches were agitated to mix in the antioxidant, and a small amount of each (3-5 pounds) were drum dried. The polymer was very difficult to dry as it had unusually high tack.

The following table 10-1 contains a summary of the polymerization, lithiation and graft polymerization of each of the runs. In each of the experiments there was a considerable drop in polymer inherent viscosity (DSV) after lithiation. It can be seen from this data on Sample 10-C that there is no significant change in polymer DSV after four hours, indicating substantial completion of the lithiation. All samples taken from the reactor were pressured into sealed bottles containing methanol and antioxidant solution under a nitrogen atmosphere. This sampling technique prevented gelation while terminating and stabilizing the polymer. The samples were dried on the drum dryer. There was no evidence of gel or block styrene in any of the final polymers.

The following Table 10-2 compares properties of Sample 10-C with natural rubber and butadiene-styrene copolymer, SBR.

FIGS. 1 and 2 are Gel Permeation Chromatograph (GPC) plots for Samples 10-B and 10-C, respectively. The graphs show GPC tracings before metalation and after graft polymerization. The molecular weight distribution is considerably broadened after the graft polymerization. Also the peak height has shifted to a lower molecular weight which along with the decrease in DSV indicates that metalation causes chain scission of the polyisoprene backbone.

TABLE 10-1

| POLYMERIZATION | | |
|---|---|---|
| Pzn* Level of BuLi | Temp. | Mooney |

TABLE 10-1-continued

| SAMPLE | 100 gms monomer | Max. °F. | ML/4/ 212 | DSV | Gel % |
|---|---|---|---|---|---|
| 10-A | 0.0283 | >200 | 67 | 2.7 | 0 |
| 10-B | 0.0283 | 172 | 45 | 2.56 | 0 |
| 10-C | 0.0212 | 144 | 67 | 2.91 | 0 |

| LITHIATION | | | | | | GRAFT POLYMERIZATION | | | | | |
|---|---|---|---|---|---|---|---|---|---|---|---|
| TMEDA** MMol 100 gms polymer | BuLi MMol 100 gms polymer | Time Hrs. | Temp. °F. | DSV | Gel % | Sty phr | Iso phr | % Sty Ref. Index | Mooney ML/4/ 212 | DSV | GEL |
| 30. | 24. | 22 | 125 | 1.50 | 0 | 30 | 0 | 26.2 | 13 | 1.51 | 0 |
| 30. | 24. | 24 | 125 | 1.29 | 0 | 30 | 20 | 25.1 | 10 | 1.37 | 0 |
| 30. | 24. | 2 | 125 | 2.25 | 0 | | | | | | |
| | | 4 | | 1.89 | 0 | | | | | | |
| | | 8 | | 1.97 | 0 | | | | | | |
| | | 16 | | 1.89 | 0 | | | | | | |
| | | 20 | 123 | 3.1 | 45 | 30 | 20 | 23.6 | 18 | 1.61 | 0 |

*Polymerization
**Tetramethylethylenediamine

TABLE 10-2

COMPARISON OF VULCANIZATES

| | | | | |
|---|---|---|---|---|
| Natural Rubber | 100 | — | 50 | — |
| Sample 10-C | — | 100 | — | 50 |
| SBR | — | — | 50 | 50 |
| HAF Black | 50 | 50 | 40 | 40 |
| FEF Black | — | — | 22 | 22 |
| Zinc oxide | 3.0 | 3.0 | 3.0 | 3.0 |
| Stearic acid | 2.6 | 2.6 | 2.0 | 2.0 |
| Dutrex 726 | 3.0 | 3.0 | — | — |
| Medium Processing oil | — | — | 7.45 | 7.45 |
| Resin Plasticizer | — | — | 17 | 17 |
| Antioxidant | 2.6 | 2.6 | — | — |
| Sulfur | 2.6 | 2.6 | 1.8 | 1.8 |
| Accelerator | 0.35 | 0.35 | 2.1 | 2.1 |
| Retarder | 0.5 | 0.5 | — | — |

Green Stress-Strain:

| | | | | |
|---|---|---|---|---|
| Peak, lbs. | 11.9 | 2.3 | 2.9 | 3.2 |
| Break, lbs. | 11.9 | — | 0.5 | 0.1 |
| Lbs. at max. elong. | — | 0.3 | — | — |
| Elongation, % | 938 | 1825 | 900 | 1450 |

Normal Stress-Strain:

| 300% Modulus, psi | | 280°F. Cure | | 300°F. Cure | |
|---|---|---|---|---|---|
| | 45' | 1925 | 400 23' | 2375 | 1875 |
| | 60' | 1975 | 450 30' | 2375 | 1850 |

| Tensile Strength, psi | | | | | |
|---|---|---|---|---|---|
| | 45' | 3400 | 1525 23' | 2675 | 2350 |
| | 60' | 3400 | 1325 30' | 2625 | 2325 |

| Elongation at Break,% | | | | | |
|---|---|---|---|---|---|
| | 45' | 440 | 745 23' | 320 | 360 |
| | 60' | 430 | 675 30' | 320 | 360 |

Stress-Strain After Aging 2 days at 212° F.

| 300% Modulus, psi | | | | | |
|---|---|---|---|---|---|
| | 45' | — | 375 15' | — | — |
| | 60' | — | 400 23' | — | — |

| Tensile Strength, psi | | | | | |
|---|---|---|---|---|---|
| | 45' | 525 | 800 15' | 1450 | 1875 |
| | 60' | 500 | 825 23' | 2275 | 1950 |

| Elong. at Break,% | | | | | |
|---|---|---|---|---|---|
| | 45' | 230 | 550 15' | 170 | 190 |
| | 60' | 220 | 490 23' | 230 | 210 |

Forced Vibrator Test at 100° C.

| | 60' Cure at 280° F. | |
|---|---|---|
| Dynamic Modulus, psi | 194 | 77 |
| Static Modulus, psi | 173 | 42 |
| Internal Friction, kps | 3.3 | 2.9 |
| Shore "A" Hardness at 73° F. | 70 | 62 |

EXAMPLE 11

An 18%-solution of isoprene in heptane was added to six different bottles. Then n-butyllithium (BuLi) was added for catalysis. (In the following tables the "mM" stands for millimoles.)

TABLE 11-1

| SAMPLE NO. | MONOMER, gms. | n-BUTYLLITHIUM, mM. |
|---|---|---|
| 11-A | 61 | 0.150 |
| 11-B | 61 | 0.150 |
| 11-C | 60 | 0.150 |

TABLE 11-1-continued

| SAMPLE NO. | MONOMER, gms. | n-BUTYLLITHIUM, mM. |
|---|---|---|
| 11-D | 61 | 0.150 |
| 11-E | 61 | 0.150 |
| 11-F | 61 | 0.150 |

The solutions were polymerized at 50°C. for 3 –¼ hours and then metalated, using 24 mmoles of n-butyllithium and 30 mmoles of tetramethylethylenediamine (TMEDA) per 100 moles of polymer. The metalation was continued for 17 hours at 50°C.

To the metalated polymers the following monomer or monomers were added in the amounts shown in Table 11-2. The isoprene was added as in 18%-solution in heptane and the butadiene was added as a 22%-solution in hexane. Sample 11-F was not reacted further, but was killed with methanol, and in the following tables serves as a control.

TABLE 11-2

| SAMPLE NO. | ISOPRENE, gr. | BUTADIENE, gr. | STYRENE, gr. |
|---|---|---|---|
| 11-A | 20 | 0 | 0 |
| 11-B | 0 | 20 | 0 |
| 11-C | 0 | 0 | 20 |
| 11-D | 0 | 15.2 | 25.6 |
| 11-E | 15.2 | 0 | 25.6 |
| 11-F (killed) | | | |

The bottles were heated at 50°C. for 2 hours and then the contents were killed with methanol and then coagulated in methanol. The polymers were dried in a vacuum oven at 60°C. over night. The yields are recorded in the following table:

TABLE 11-3

| SAMPLE NO. | THEORETICAL, gms. | YIELD, gms. |
|---|---|---|
| 11-A | 80 | 81.7 |
| 11-B | 80 | 78.6 |
| 11-C | 80 | 79.5 |
| 11-D | 101.8 | 99.9 |
| 11-E | 101.8 | 104.2 |
| 11-F | 61 | 62. |

No gel was formed. The inherent viscosity dl/g (DSV) was determined and is recorded in the following table. There was no gel in any of the samples. Several of the samples were tested for their content of block styrene, with the results recorded below.

TABLE 11-4

| SAMPLE NO. | DSV | % GEL | % BLOCK STYRENE |
|---|---|---|---|
| 11-A | 1.60 | 0 | — |
| 11-B | 1.90 | 0 | — |
| 11-C | 1.62 | 0 | (0.5) |
| 11-D | 1.68 | 0 | 0 |
| 11-E | 1.53 | 0 | 0 |
| 11-F | 1.70 | 0 | — |

TABLE 12-2

| SAMPLE NO. | n-BuLi, mM/ 100 gr. Polymer | TMEDA, mM/ 100 gr. polymer |
|---|---|---|
| 12-A | 24 | 30 |
| 12-B | 24 | 30 |
| 12-C | 24 | 30 |
| 12-D | 24 | 30 |
| 12-F | 24 | 30 |

TABLE 11-5

EVALUATION OF METALATED POLYMERS

| SAMPLE NO.: | 11-A | 11-B | 11-C | 11-D | 11-E | 11-F |
|---|---|---|---|---|---|---|
| Recipe: | | | | | | |
| Polymer | 100 | | | | | |
| Black | 62 | | | | | |
| Processing filler | 24 | | | | | |
| Instron Wind-up Tack, lbs/in | | | | | | |
| Average | 1.8 | 1.6 | 3.9 | 7.5 | 13.5 | 1.1 |
| Green Stress-Strain | | | | | | |
| Initial, lbs. | 1.4 | 1.2 | 2.9 | 3.0 | 2.0 | 1.4 |
| Peak, lbs. | 1.4 | 1.3 | 2.9 | 3.0 | 2.0 | 1.4 |
| Elong. at Peak,% | 0.0 | 100 | 0.0 | 0.0 | 0.0 | 0.0 |
| Break, lbs. | 0.2 | 0.2 | 0.2 | 0.2 | NB* | 0.2 |
| Elong. at Break,% | 425 | 375 | 625 | 1500 | — | 250 |
| Lbs. at 1000% Elong. | — | — | — | 0.6 | 0.4 | — |
| Lbs. at 1800% Elong. | — | — | — | — | 0.1 | — |
| Normal Stress-Strain 300° F. cure | | | | | | |
| 300% Modulus, psi | | | | | | |
| 15 min. cure | 1025 | 975 | 1225 | 800 | 875 | 1250 |
| 25 min. cure | 1025 | 1000 | 1225 | 825 | 925 | 1275 |
| Tensile Strength, psi | | | | | | |
| 15 min. cure | 1775 | 1725 | 2075 | 1925 | 1900 | 2225 |
| 25 min. cure | 1725 | 1725 | 2075 | 1900 | 1925 | 2100 |
| Ultimate Elongation % | | | | | | |
| 15 min. cure | 470 | 460 | 490 | 560 | 550 | 490 |
| 25 min. cure | 430 | 470 | 480 | 540 | 530 | 470 |

*N.B. means "No Break".

It is noted that samples 11-D and 11-E stood elongations greater than 1000%, whereas none of the other samples or the control (Sample 11-F) did.

EXAMPLE 12

Six bottles were prepared. Four of them were filled with 23%-butadiene (BD) in heptane, one was filled with 18%-isoprene (iso) in heptane, and the sixth was filled with a 50 —50 mixture. n-Butyllithium (BuLi) was added as catalyst. The amounts are recorded in the following table:

TABLE 12-1

| SAMPLE NO. | MONOMER | GRAMS | n-BUTYLLITHIUM, mM |
|---|---|---|---|
| 12-A | Butadiene | 70.5 | 0.170 |
| 12-B | Butadiene | 69.5 | 0.170 |
| 12-C | Butadiene | 69.0 | 0.170 |
| 12-D | Butadiene | 69.2 | 0.170 |
| 12-E | Isoprene | 60.5 | 0.161 |
| 12-F | Butadiene/isoprene | (39.6 ISO) (28.0 BD) | 0.170 |

The samples were polymerized for 3 hours at 50°C. and then all except Sample 12-E were metalated with n-butyllithium and tetramethylethylenediamine (TMEDA) in the amounts recorded in the following table:

Sample 12-E is the control polymer and was not metalated or grafted. The other bottles were metalated for 17 hours at 50°C. and then butadiene in solution, isoprene in solution and styrene (St) were added in the amounts given in the following table:

TABLE 12-3

| SAMPLE NO. | MONOMER | GRAMS | MONOMER | GRAMS |
|---|---|---|---|---|
| 12-A | Butadiene | 25.5 | | |
| 12-B | Isoprene | 23.7 | | |
| 12-C | Styrene | 26.0 | | |
| 12-D | Isoprene | 18.8 | Styrene | 31.1 |
| 12-F | Styrene | 22.7 | | |

The polymers, including Sample 12-E which had not been metalated, were then polymerized for 2 hours at 50°C. with the following yields:

TABLE 12-4

| SAMPLE NO. | THEORETICAL, gms. | YIELD, gms. |
|---|---|---|
| 12-A | 96.0 | 75.6 |
| 12-B | 93.2 | 77.4 |
| 12-C | 95.0 | 78.7 |
| 12-D | 119.1 | 107.7 |
| 12-E | 60.5 | 62.3 |
| 12-F | 90.3 | 80.1 |

No gel was formed. The inherent viscosity dl/g. (DSV) was determined as well as the amount of block styrene.

TABLE 12-5

| SAMPLE NO. | DSV | % GEL | % BLOCK STYRENE | % STYRENE |
|---|---|---|---|---|
| 12-A | 1.60 | 0 | — | — |
| 12-B | 1.32 | 0 | — | — |
| 12-C | 1.18 | 0 | 3.3 | 27 |
| 12-D | 0.73 | 0 | 8.0 | 31 |
| 12-E | 2.92 | 0 | — | — |
| 12-F | 0.68 | 0 | 4.18 | 23 |

EXAMPLE 13

METALATION OF POLYSTYRENE WITH INCREASED IMPACT STRENGTH

A 17.5-percent by weight solution of pure butadiene in hexane was polymerized at 50°C. with one millimole of butyllithium/100 grams of butadiene as catalyst. To the polymer cement obtained was added 6 millimoles of butyllithium and 6 millimoles of TMEDA per 100 grams of butadiene. This solution was heated 2 hours at 50°C. The solution then contaned 16.1 per cent solids, representing a conversion of 96 per cent. A portion of this solution, 24 ml., containing 3.86 g. of polymer was removed by syringe and transferred to a polymerization bottle containing 400 ml. of pure dry hexane. No air or moisture was allowed to contact the polymer solution during the transfer. The hexanepolymer mixture was stirred to dissolve the polymer and then 36.2 g. of pure, dry styrene were added by syringe. After three days at room temperature the polymer was recovered by coagulation in methanol. After drying in a vacuum oven at 50°.C. it weighed 39.4 g. (97 per cent conversion) and was a granular white solid which was found to contain 83.2 per cent styrene. The Izod Impact Strength of this material at room temperature was 0.4 ft.lbs./inch of notch or approximately double that of a polystyrene not containing polybutadiene. The Rockwell "M" hardness was 39. The product was clear and colorless.

We claim:

1. The method of polylithiating an unsaturated polymer from the class consisting of homopolymers and copolymers containing a plurality of olefinic groups and copolymers which contain conjugated diene groups of 4 to 6 carbon atoms and aryl groups, which method consists of reacting the polymer with a lithiating reagent and bridgehead amine selected from the class consisting of 1-aza(2,2,2) bicyclooctane and 4-methyl and 4-ethyl substituents thereof, triethylene diamine and sparteine, the ration of active lithium atoms in said lithiating reagent to the molecules of said amine being at least 0.01.

2. The method claim 1 wherein the bridgehead amine is triethylene diamine.

3. The process of claim 1 in which the lithiating compound is a saturated alkyllithium in which the alkyl group contains 1 to 20 carbon atoms.

4. The process of claim 1 in which the lithiating compound is an unsaturated alkyllithium in which the alkyl group contains 1 to 20 carbon atoms.

5. The process of claim 1 in which the lithiating compound is from the class consisting of lithium derivatives of phenyl, naphthyl, tolyl and alkyl derivatives of said arlyl groups in which the alkyl group contains 1 to 20 carbon atoms.

6. The process of claim 1 in which the lithiating compound is N-butyllithium.

7. The process of claim 1 in which the polymer is a polybutadiene.

8. The process of claim 1 in which the polymer is a rubbery copolymer of butadiene and styrene.

9. The process of claim 1 in which the polymer is a polyisoprene.

10. The process of claim 1 in which the polymer is a rubbery copolymer of isobutylene and isoprene.

11. The process of claim 1 in which the polymer is a rubbery copolymer of butadiene and isoprene.

12. The process of claim 1 in which the polymer is EPT.

13. The method of claim 1 wherein the polylithiated unsaturated polymer is, prior to inactivation of said lithiating reagent, further treated with a compound capable of replacing the lithium atoms with more stable radicals.

14. The method of claim 13 wherein the compound capable of replacing the lithium atoms with more stable radicals is carbon dioxide.

15. The method of claim 13 wherein the compound capable of replacing the lithium atoms with more stable radicals is ethylene oxide.

* * * * *